(12) United States Patent
Rempe et al.

(10) Patent No.: US 9,437,085 B1
(45) Date of Patent: Sep. 6, 2016

(54) IN-BASKET DIGITAL DONATION SYSTEM

(71) Applicants: Nathan D. Rempe, Lincoln, NE (US); Scott Rempe, Austin, TX (US)

(72) Inventors: Nathan D. Rempe, Lincoln, NE (US); Scott Rempe, Austin, TX (US)

( * ) Notice: Subject to any disclaimer, the term of this patent is extended or adjusted under 35 U.S.C. 154(b) by 0 days.

(21) Appl. No.: 14/873,996

(22) Filed: Oct. 2, 2015

Related U.S. Application Data

(60) Provisional application No. 62/058,863, filed on Oct. 2, 2014.

(51) Int. Cl.

| | |
|---|---|
| *G06K 5/00* | (2006.01) |
| *G07G 1/00* | (2006.01) |
| *G06Q 20/10* | (2012.01) |
| *G06Q 20/34* | (2012.01) |
| *G07G 1/12* | (2006.01) |
| *A47G 33/00* | (2006.01) |

(52) U.S. Cl.
CPC ............. *G07G 1/0027* (2013.01); *A47G 33/00* (2013.01); *G06Q 20/10* (2013.01); *G06Q 20/34* (2013.01); *G07G 1/12* (2013.01)

(58) Field of Classification Search
CPC .... G07F 7/0873; G07F 7/0886; G07F 7/088; G07F 7/00; G07F 17/248; G07F 17/12; G07G 1/12; G07G 1/0018; G07G 1/0027; G07D 11/00; G07D 11/0081; A47G 33/00; G06Q 20/34
USPC .......................................................... 235/380
See application file for complete search history.

(56) References Cited

U.S. PATENT DOCUMENTS

| 5,506,393 | A | * | 4/1996 | Ziarno | ................... | A47G 33/00 |
|---|---|---|---|---|---|---|
| | | | | | | 235/380 |
| 5,663,547 | A | * | 9/1997 | Ziarno | ................... | A47G 33/00 |
| | | | | | | 235/375 |
| 5,665,952 | A | * | 9/1997 | Ziarno | ................... | A47G 33/00 |
| | | | | | | 235/380 |
| 5,696,366 | A | * | 12/1997 | Ziarno | ................... | A47G 33/00 |
| | | | | | | 235/380 |
| 5,869,825 | A | * | 2/1999 | Ziarno | ................... | A47G 33/00 |
| | | | | | | 235/380 |
| 5,887,273 | A | * | 3/1999 | Ziarno | ...................... | G07F 5/22 |
| | | | | | | 705/35 |
| 7,789,542 | B2 | * | 9/2010 | Lederer | .................. | A47G 33/00 |
| | | | | | | 362/161 |

OTHER PUBLICATIONS

IR—Link Mobility Group, http://ir.asp.manamind.com/products/html/companyDisclosuresArchiv . . . , "Link Mobility Group ASA: Mobile Payment Agreement with Church of Sweden", Apr. 8, 2014 12:41, http://www.newsweb.no/index.jsp?messageId=358061, 1 page.

Business & Financial News, Breaking US & International News / Reu . . . , http://www.reuters.com/assets/print?aid=USBREA4L0I420140522, "Church of Norway plans to pass an electronic collection basket", Thu., May 22, 2014, 1 page.

* cited by examiner

*Primary Examiner* — Thien M Le
*Assistant Examiner* — Claude J Brown
(74) *Attorney, Agent, or Firm* — Westman, Champlin & Koehler, P.A.

(57) ABSTRACT

An integrated electronic donation acceptance device and money collection basket. The money collection basket is portable. The electronic donation acceptance device includes a housing and circuitry that is capable of receiving electronic payments. At least a portion of the housing of the electronic donation acceptance device is releasably couplable to the money collection basket.

12 Claims, 14 Drawing Sheets

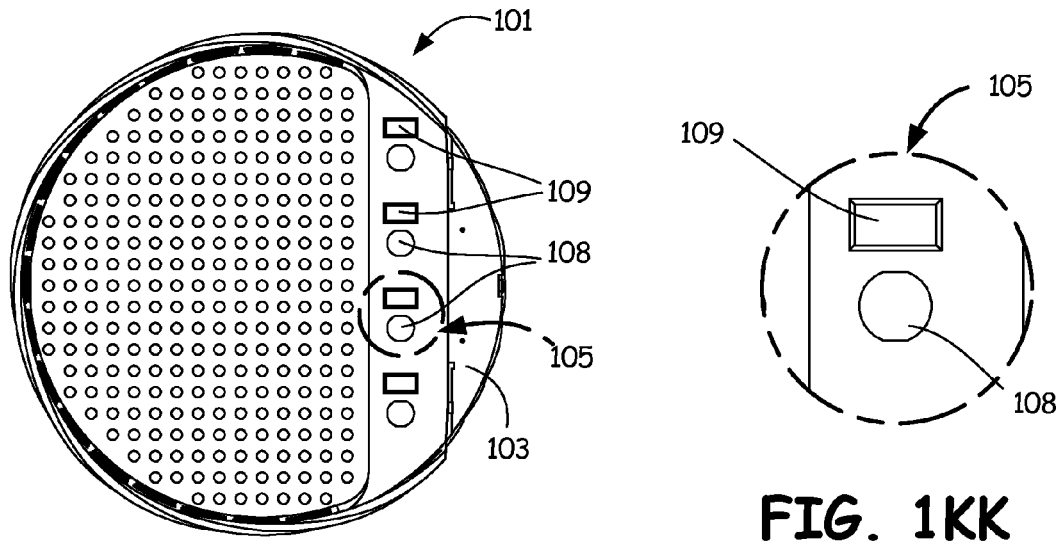
FIG. 1K
FIG. 1KK
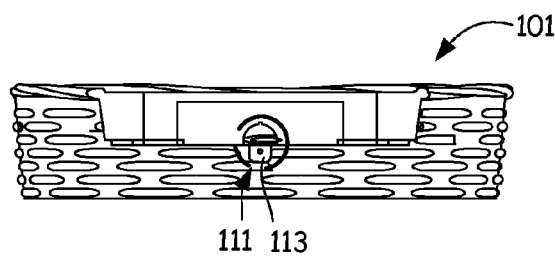
FIG. 1L
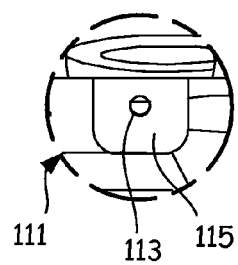
FIG. 1LL
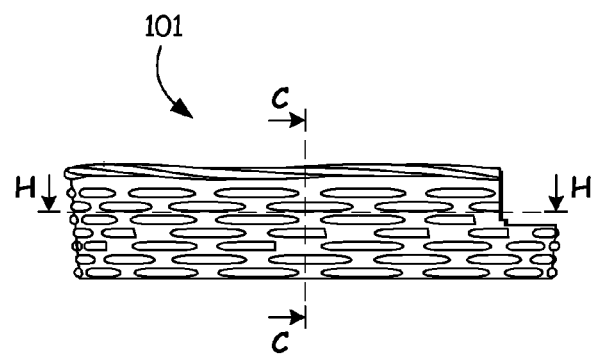
FIG. 1M

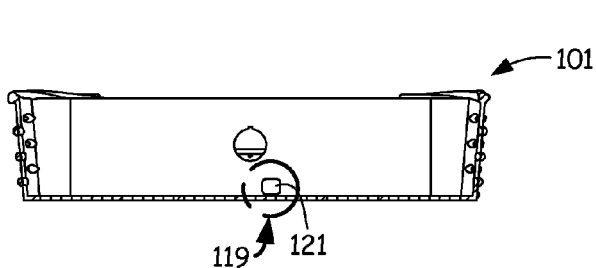
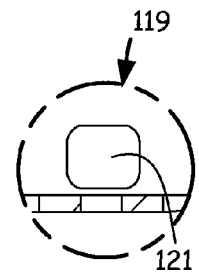
FIG. 1N
FIG. 1NN
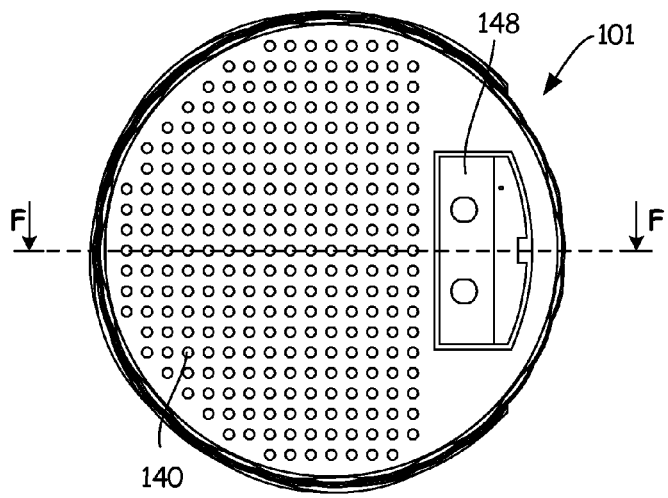
FIG. 1O
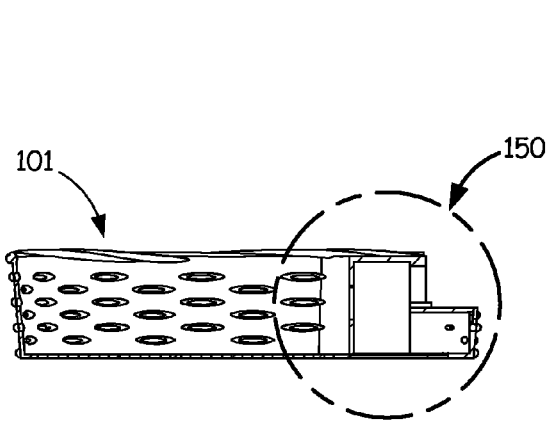
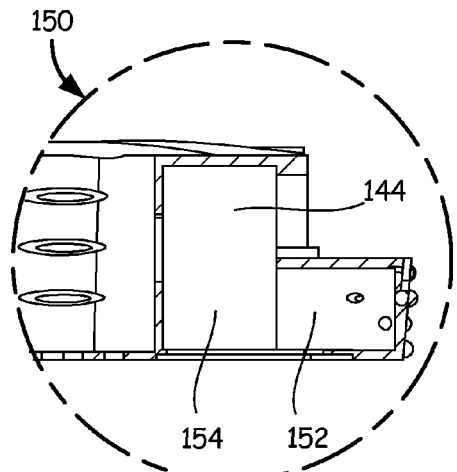
FIG. 1P
FIG. 1PP

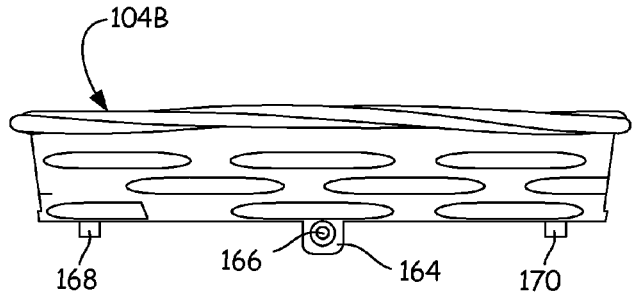
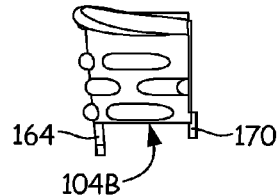
FIG. 1U   FIG. 1V
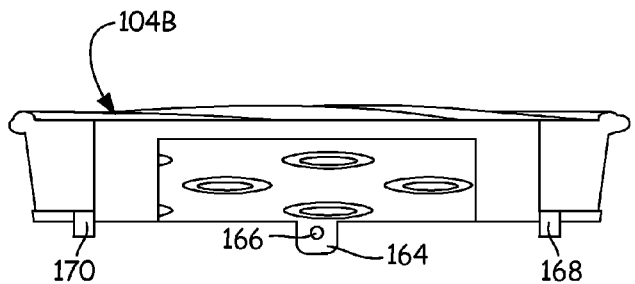
FIG. 1W
FIG. 1X
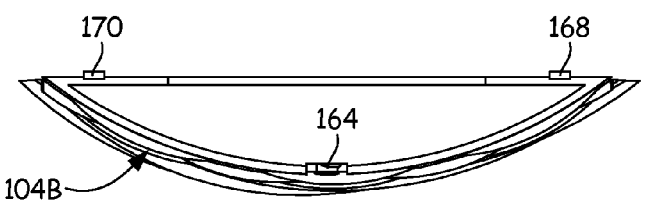
FIG. 1Y
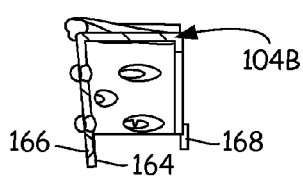
FIG. 1Z

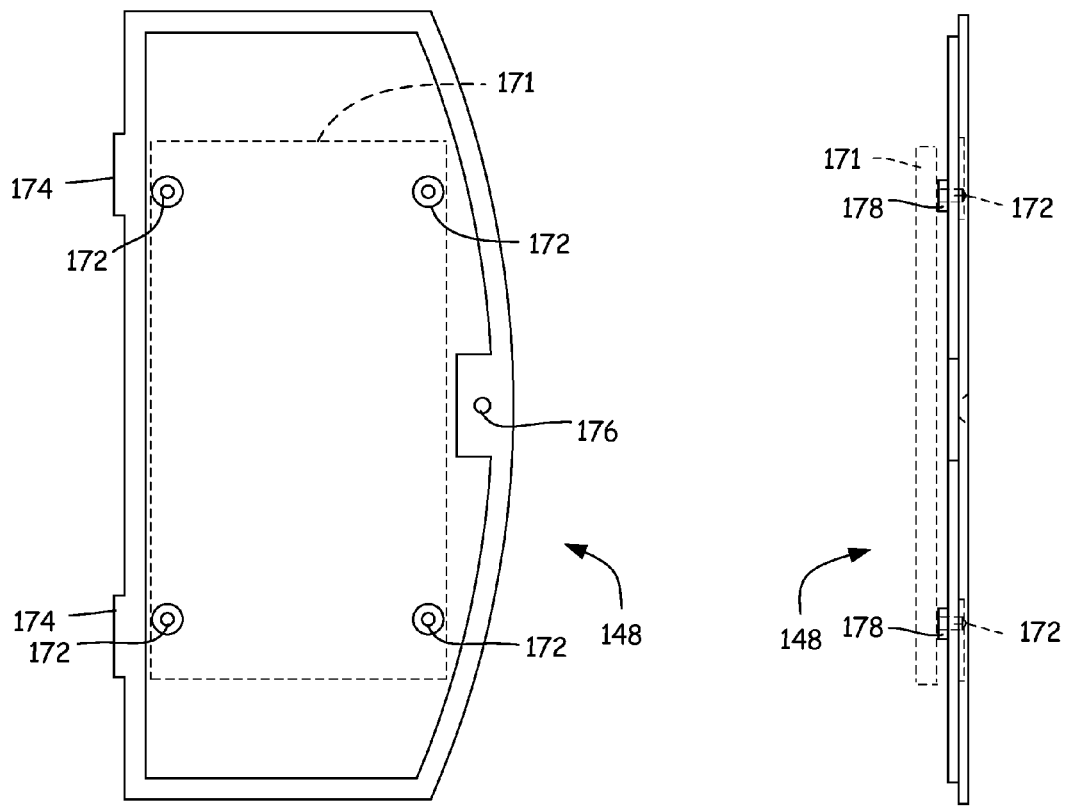
FIG. 1AA
FIG. 1AB
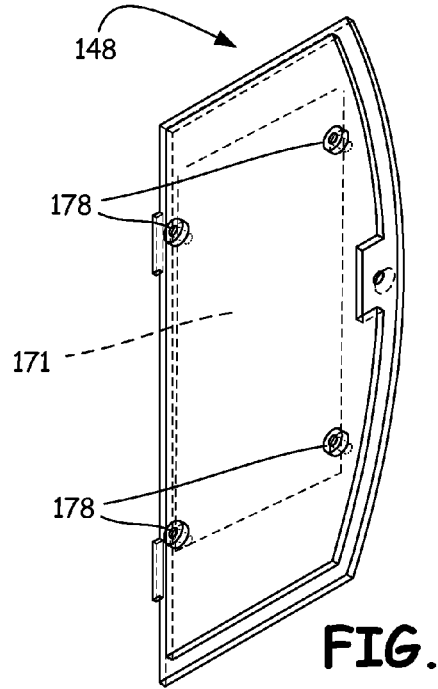
FIG. 1AC

IN-BASKET DIGITAL DONATION SYSTEM

The present application claims priority to U.S. Provisional Application Ser. No. 62/058,863, filed Oct. 2, 2014 and entitled "IN-BASKET DIGITAL TITHING SYSTEM," the content of which is hereby incorporated by reference in its entirety.

BACKGROUND

It is a tradition in many institutions to pass a basket into which donors that have cash or check have the opportunity to donate. However, when such a traditional basket is passed, donors that do not have cash or check cannot donate.

SUMMARY

The present embodiments provide an in-basket secure digital donation system that allows donors that do not have cash or check the opportunity to donate.

In one embodiment, a donation device is provided. The device includes an integrated portable money collection basket and electronic donation acceptance device.

BRIEF DESCRIPTION OF THE DRAWINGS

FIGS. 1G through 1AC are diagrammatic illustrations of different views of a combined portable money collection basket and electronic payment receiver in accordance with one embodiment.

FIGS. 1KK, 1LL, 1NN, 1PP and 1QQ are enlarged detail views of sections 105, 111, 119, 150 and 156 in FIGS. 1K, 1L, 1N, 1P and 1Q, respectively.

DETAILED DESCRIPTION OF ILLUSTRATIVE EMBODIMENTS

The present embodiments relate to an intuitive donation acceptance device that allows donors the opportunity to donate to their respective institution, using an existing "pass the basket process," yet through a completely digital experience. The device is small and unobtrusive and attaches to, for example, an inside edge of a collection basket. One embodiment of the device features a credit card reader (for example, a magnetic stripe reader or "Smart Chip" credit card reader), Bluetooth, near-field communication (NFC) and radio frequency identification (RFID) hardware and standards and a light-emitting diode (LED) selection button interface that can be customizable to denominations preferred by a particular parish. The device uses, for example, a simple Universal Serial Bus (USB) cable to transfer captured data stored in its internal memory to a personal computer (PC) hosting donation acceptance software. The device not only allows parishioners that do not have cash or check on hand the ability to donate during any service, but it also encourages them to take the opportunity to donate more than they traditionally might if they had cash.

Figure 1A:
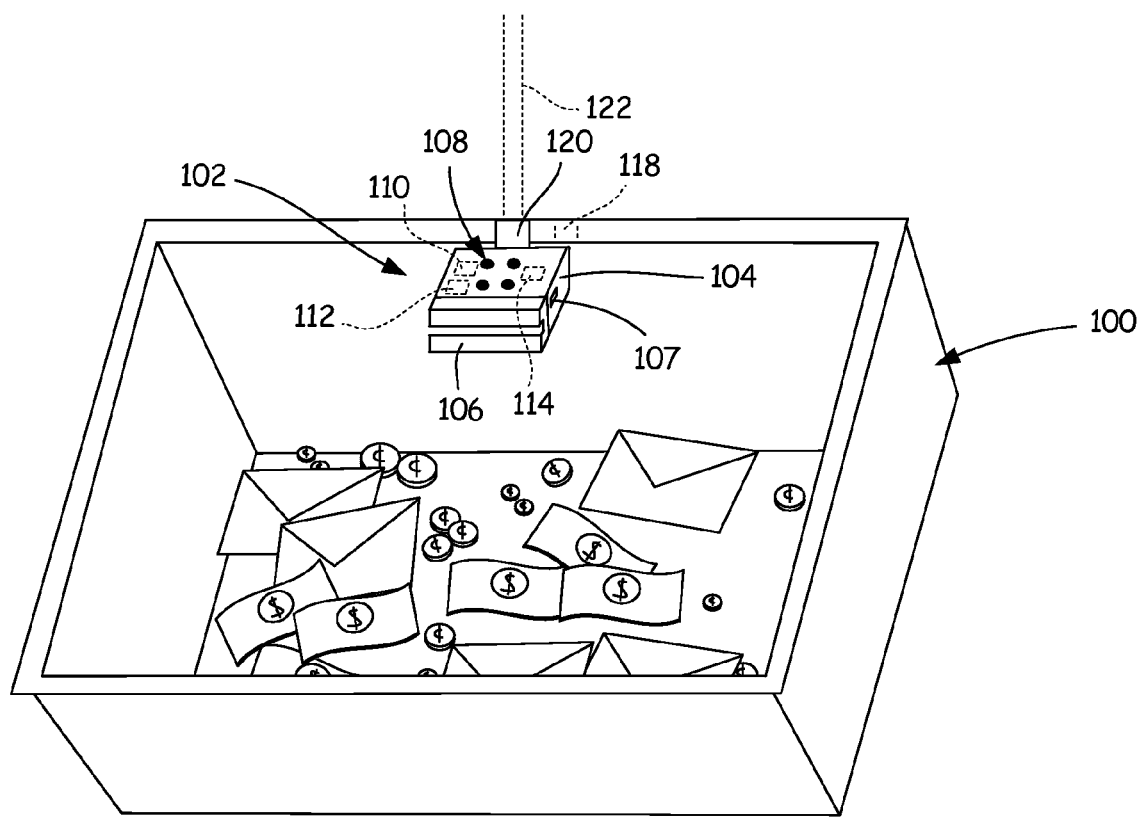
FIG. 1A is a diagrammatic illustration showing a portable money collection basket with an attached electronic payment receiver.

FIG. 1A is a diagrammatic illustration showing a portable money collection basket (for example, a religious donation collection basket) 100 with an electronic payment receiver or electronic donation acceptance device 102 attached to the basket 100 in accordance with one embodiment.

In the embodiment of FIG. 1A, electronic payment receiver 102 includes a housing 104, a reader (for example, a magnetic stripe reader or "Smart Chip" credit card reader, or the like) 106 and donation amount/denomination selection buttons 108.

A control circuit 110, a memory 112 and power supply circuitry 114 are included within housing 104. In the interest of simplification, electrical connections between different components of electronic payment receiver are not shown. Electronic payment receiver 102 may be switched on and off using, for example, a switch 107.

In some embodiments, power supply circuitry 114 includes a 9-Volt battery. In other embodiments, power supply circuitry 114 may include AA batteries, AAA batteries, etc., of any suitable voltage. In some embodiments, power control circuit circuitry 114 includes rechargeable batteries/capacitors that may be recharged using any suitable technique. In certain embodiments, power may be supplied to electronic payment receiver 102 from an external power source. For example, in one embodiment, basket 100 may include a battery cavity/compartment 118 with one or more batteries that supply power to components within payment receiver 102 via power supply circuitry 114. In such embodiments, power supply circuitry 114 does not include one or more batteries and can comprise electrical connectors that couple to corresponding electrical connectors within cavity/compartment 118. In a particular embodiment, payment receiver 102 may comprise a plug that fits into a socket within cavity/compartment 118. For simplification, additional components such as pull up and/or pull down resistors and other power supply circuitry that may be employed within circuitry 114 to provide power to components within payment receiver 102 are not shown or described. As noted above, in some embodiments, a USB cable, for example, is utilized to transfer captured data stored in internal memory 112 of device 102 to an external computer. In such embodiments, during the data transfer operation, device 102 may receive its power via the computer. In some embodiments, memory 112 is operatively insertable into both electronic payment receiver 102 and a computer. In such embodiments, insertable/removable memory 112 is inserted into device 102 when the device 102 is used to electronically receive donations. To transfer captured donation-related data stored in insertable/removable memory 112, memory 112 is simply removed from device 102 and operatively coupled to a computer that includes software that is capable of carrying out the data transfer. It should be noted that the captured data is stored in an encrypted form in memory 112.

As noted above, receiver 102 attaches to basket 100. A receiver-basket connector 120, which is configured to couple money collection basket 100 to electronic payment receiver 102, is shown as a single block in the interest of simplification. However, depending upon the type of coupling desired between payment receiver 102 and collection basket 100, receiver-basket connector 120 may include one or more components of any suitable design. In some embodiments, receiver-basket connector 120 may comprise one or more clamps. The one or more clamps may be rigidly coupled to one of the payment receiver 102 and collection basket 100 and releasably mechanically coupled to the other one of the payment receiver 102 and collection basket 100. Of course, the one or more clamps may be releasably mechanically coupled to both the payment receiver 102 and the collection basket 100. In other embodiments, receiver-basket connector 120 may comprise one or more fasteners configured to fit into grooves (not shown) in basket 100 and/or housing 104 of payment receiver 102. In some embodiments, receiver-basket connector 120 may include cooperative hook and loop mechanical fasteners or the like (attached to housing 104 of payment receiver 102 and attached to basket 100) to enable releasable mechanical coupling between payment receiver 102 and collection basket 100. In some embodiments, instead of hook and loop fasteners, receiver-basket connector 120 may comprise a double-sided adhesive tape. In other such embodiments, receiver-basket connector 120 may comprise a loop (formed of plastic, for example) that is configured to fit around a pole 122 that may be attached to donation basket 100. The loop may be rigidly coupled to, or formed integrally with, housing 104 of payment receiver 102. In some embodiments, receiver-basket connector 120 may comprise a hook and loop fastener strap that is attached to housing 104, of payment receiver 102, and configured to wrap around pole 122. As indicated above, in some embodiments, payment receiver 102 is configured to releasably mechanically and electrically couple to collection basket 100. In such embodiments, receiver-basket connector 120 may include any suitable male and female plug fittings capable of providing the releasable mechanical and electrical coupling between payment receiver 102 and collection basket 100.

As noted above, reader 106 may comprise a "Smart Chip" credit card reader. In such embodiments, reader 106 is configured to receive a portion of a chip-equipped card such that data from the chip on the card is obtainable by the reader 106 when the portion of the chip-equipped card is within, for example, a slot included in reader 106. Such an embodiment of reader 106 may include a suitable user interface for the user to enter a personal identification number or other identifier for verification/approval before payment receiver 102 processes the donation transaction.

In the embodiment of FIG. 1A, payment receiver 102 is releasably coupled to collection basket 100. However, in some embodiments, collection basket 100 and payment receiver 102 are integrated to form a single unit. Examples of such embodiments are described below in connection with FIGS. 1B through 1E.

Figure 1B:
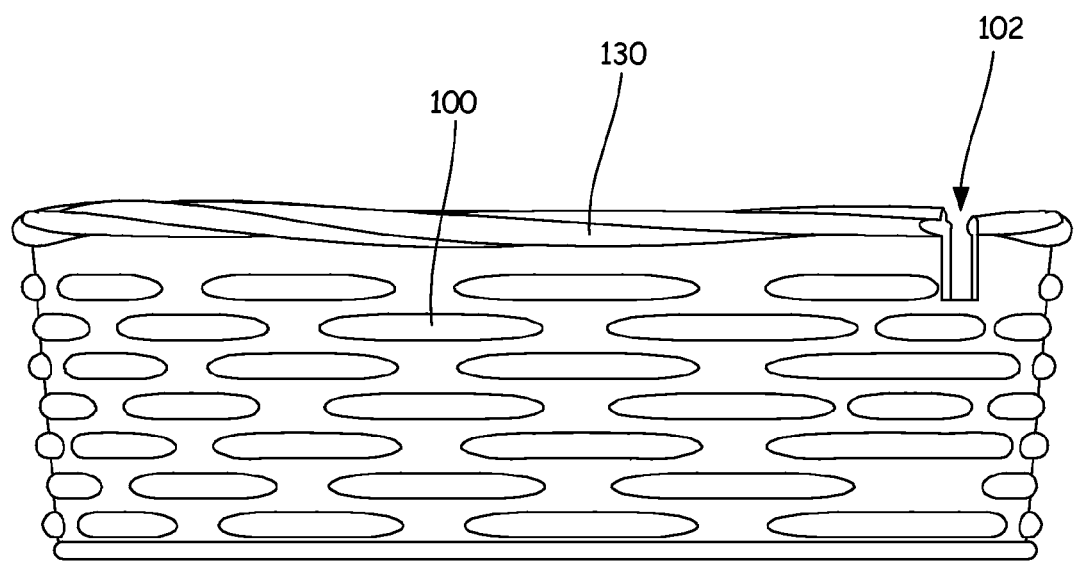
FIGS. 1B through 1E are diagrammatic illustrations of different views of a combined portable money collection basket and electronic payment receiver as a single unit.
Figure 1C:
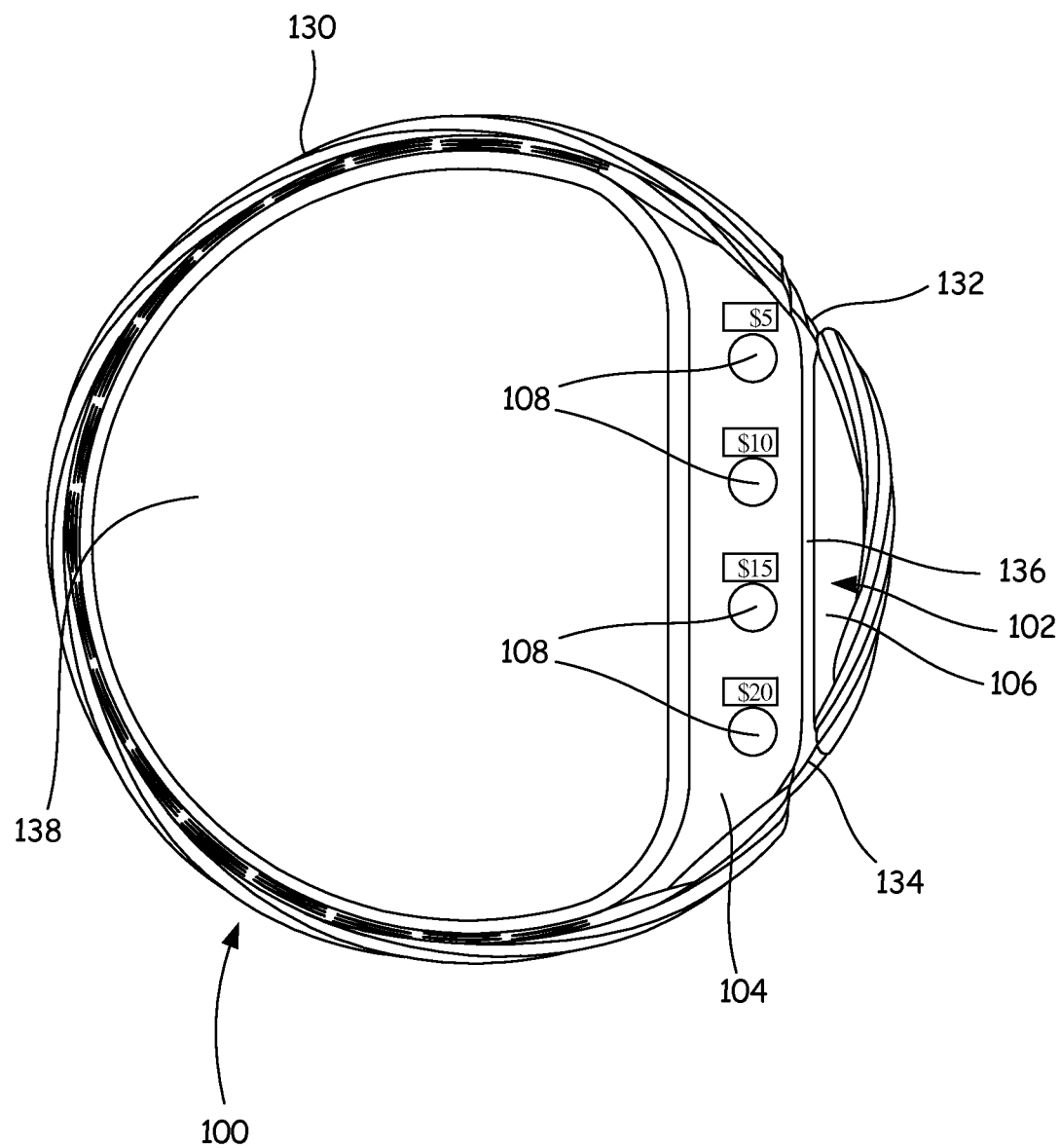
Figure 1D:
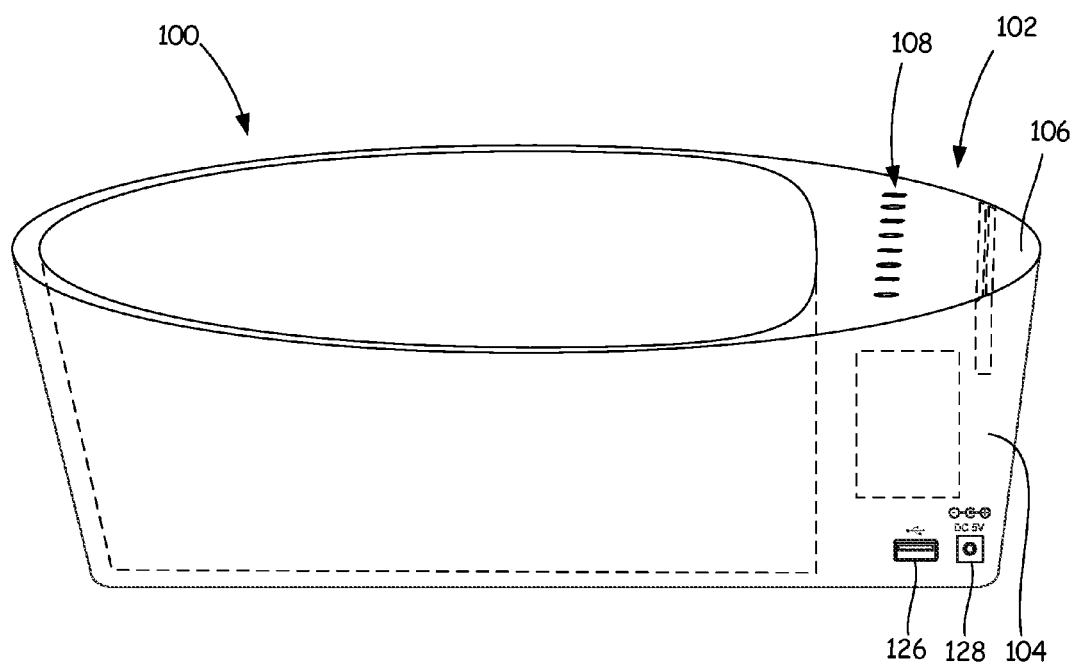
Figure 1E:
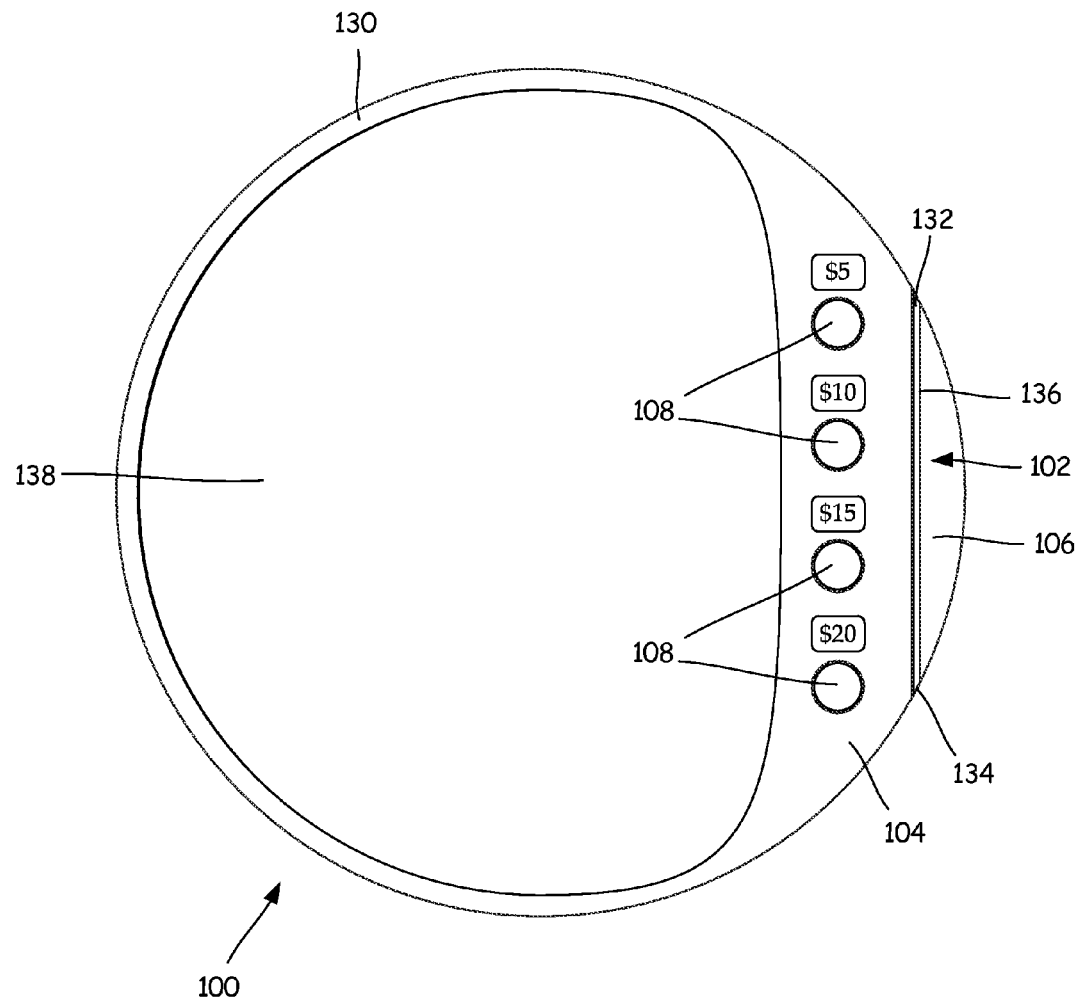

FIGS. 1B through 1E are diagrammatic illustrations of different views of a combined portable money collection basket 100 and electronic payment receiver 102 as a single unit. FIGS. 1B and 1D are side views, and FIGS. 1C and 1E are top views. In general, the components and operation of the embodiment shown in FIGS. 1B through 1E are similar to the components and operation of the embodiment shown in FIG. 1A and described above. Thus, the description of such similar components is not repeated. However, a brief description of the primary features of the embodiment shown in FIGS. 1B through 1E is included below.

As can be seen in FIGS. 1B through 1E, housing 104 of payment receiver 102 is integrated with basket 100. In some embodiments, basket 100 and housing 104 may be formed as a single unit. In certain embodiments, housing 104 may comprise a walled-off cavity within basket 100. Such embodiments may comprise a detachable cover (not separately shown in FIGS. 1B-1E) for the cavity. The cover may be removed to include circuitry (similar to the circuitry shown in FIG. 1A and described above) into the cavity and to include/replace batteries to power the circuitry/electrical components within device 102. The circuitry and the batteries are below donation amount/denomination selection buttons 108. A USB connector (for example, a female USB connector 126 shown in FIG. 1D)) may be included to transfer data contained in memory 112 to an external computer or mobile device. A power supply connector 128 (shown in FIG. 1D) may also be included to receive power from an external source to power electronic payment receiver 102 and/or to enable recharging of one or more batteries within electronic payment receiver 102. As can be seen in FIG. 1C, a rim 130 of basket 100 includes grooves 132 and 134 that are aligned with a slot 136 included in electronic payment receiver 102 to enable a user to swipe a credit card through slot 136. It should be noted that near field communication (NFC) may also be used to capture payment information. In NFC embodiments, a donor would simply hover a credit card or other suitable device over a payment area of basket 100 to transfer payment information. As noted above, in general, the embodiment of FIG. 1A is similar to the embodiment of FIGS. 1B through 1E. However, in the embodiment of FIGS. 1B through 1E, collection basket 100 and electronic payment receiver 102 are "deeply" integrated into a single unit. It should be noted that, in FIGS. 1C and 1E, regions 138 represent an inner bottom portion of basket 100.

Figure 1F:
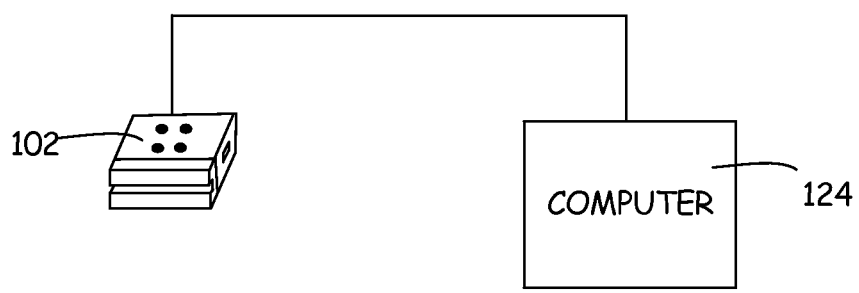
FIG. 1F is a diagrammatic illustration showing an electronic payment receiver connected to a computer.
Figure 1G:
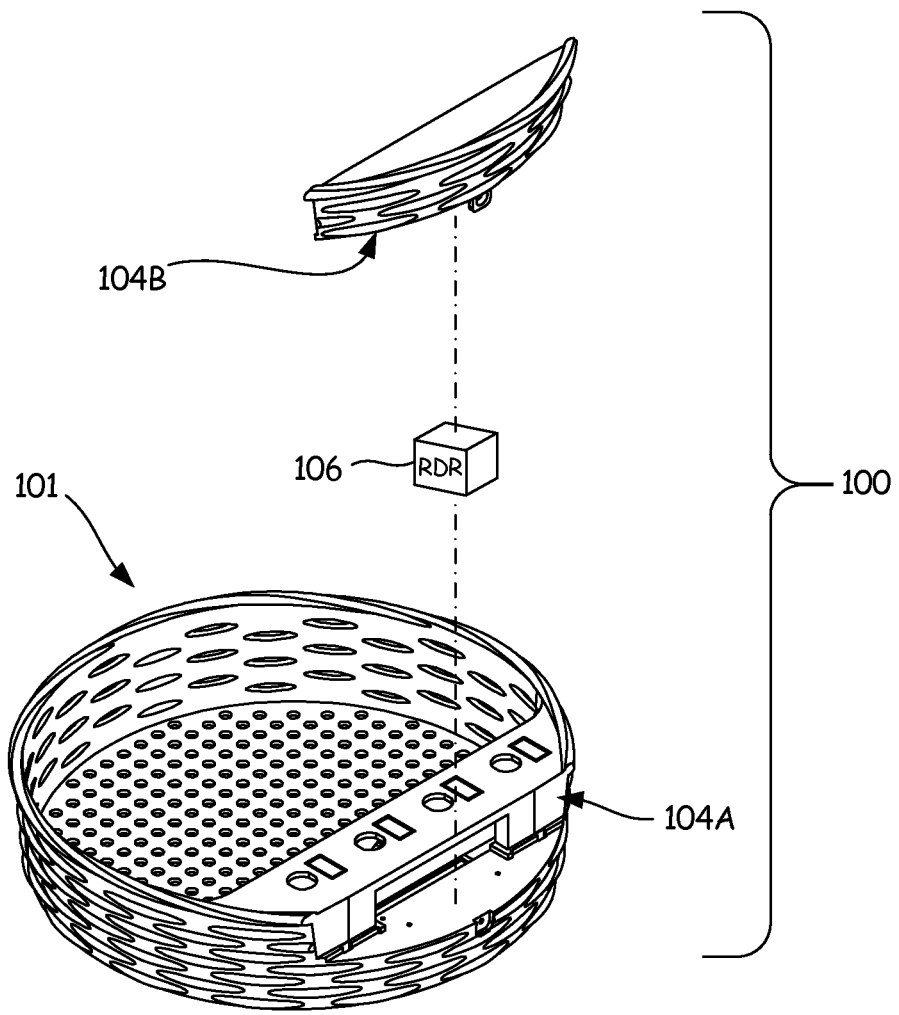

FIGS. 1G through 1AC are diagrammatic illustrations of different views of portions of a portable money collection basket 100 and an electronic payment receiver 102 in accordance with another embodiment. In the embodiment of FIGS. 1G through 1Z, housing 104 of the electronic payment receiver 102 includes a first portion 104A, which is non-detachably integrated with the basket 100, and a second portion or cap 104B that is detachably couplable to the integrated first portion 104A and basket 100. The basket 100 with the non-detachably integrated portion 104A is hereinafter referred to as a main body 101 and the second detachable portion 104B is hereinafter referred to as a cap. The main body 101 and the detachable portion 104B are shown in the exploded perspective view of FIG. 1G. A card/chip reader, which is schematically shown as element 106 in FIG. 1G, may be coupled to main body 101 using screws or any other suitable fasteners. In the interest of simplification, the card/chip reader 106 is not shown in the remaining figures (FIGS. 1H-1AC).

Figure 1H:
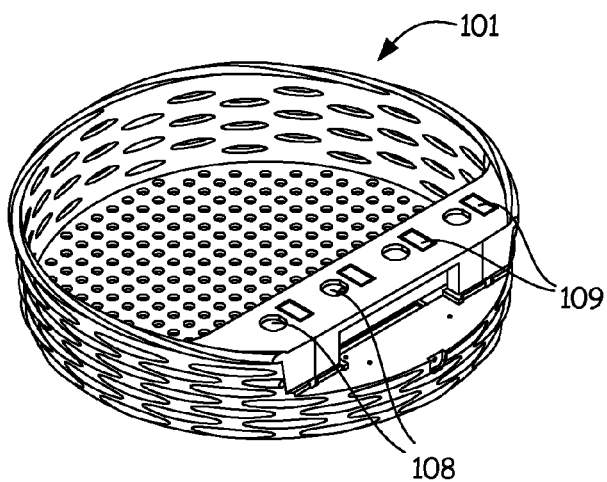
Figure 1I:
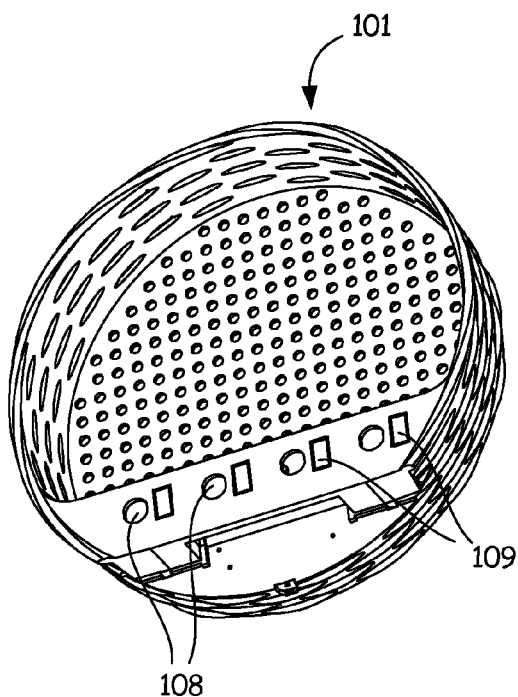
Figure 1J:
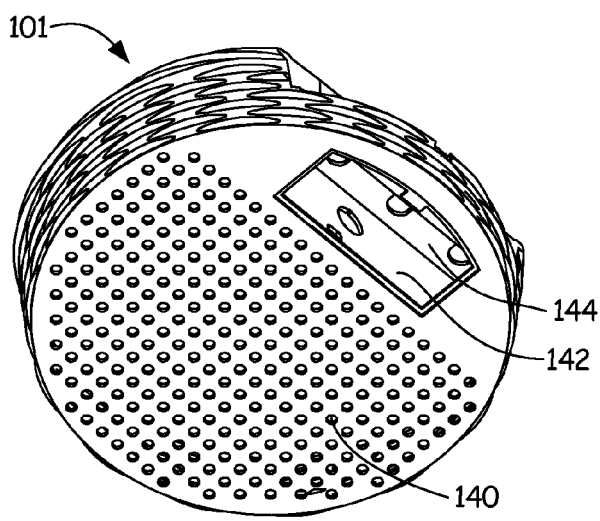

FIGS. 1H and 1I show alternate top perspective views of main body 101. As can be seen in FIG. 1H, donation amount/denomination selection buttons 108 and amount displays/tags 109 are a part of, or are attached to, portion 104A of main body 101. FIG. 1J is a bottom perspective view of main body 101. As can be seen in FIG. 1J, an outer bottom portion 140 of main body 101 includes an opening 142 into a cavity 144. The cavity 144 is configured to receive circuitry (similar to the circuitry shown in FIG. 1A and described above) and batteries to power the circuitry/electrical components within payment receiver 102. The circuitry may be mounted on an inside of a detachable cover for the opening 142, which is described further below in connection with FIGS. 1AA, 1AB and 1AC. A perimeter of opening 142 may include one or more slots, dimples or any other suitable features that are configured to receive corresponding mating features that may be included in the cover described further below.

FIG. 1K illustrates a top view of main body 101. As can be seen in FIG. 1K, main body 101 includes a ledge 103 on which the card/chip reader 106 may be mounted. FIG. 1KK shows enlarged view of section 105 in FIG. 1K, and illustrates a button 108 and an amount display/tag 109. In one embodiment, a top of button 108 has a substantially circular shape, and a top of amount/display tag 109 is substantially rectangular. Of course, elements 108 and 109 may have different shapes based on the type of application/embodiment. Also, sizes of elements 108 and 109 may differ in different embodiments/applications.

FIGS. 1L and 1M illustrate different side views of main body 101. FIG. 1LL shows enlarged view of section 111 in FIG. 1L, and shows a recess 113 in main body 101 that is configured to receive a tab of detachable portion 104B, which is described further below. In the embodiment shown in FIG. 1L, recess 113 includes a hole (for example, a screw hole) 115, which is configured to receive a fastener (for example, a screw) that helps couple the tab in cap 104B to the main body 101.

FIG. 1N is a sectional view as taken along lines C-C in FIG. 1M. FIG. 1NN shows enlarged view of section 119 in FIG. 1N, and shows a USB port 121 that serves as a connection point for a USB. In different embodiments, USB port 121 may be located in alternate locations.

FIG. 1O is a bottom view of main body 101. As can be seen in FIG. 1O, a cover 148 closes opening 142 into cavity 144 described above in connection with FIG. 1J. A circuit board (not shown in FIG. 1O) attaches to an inside of cover 148.

FIG. 1P is a sectional view as taken along lines F-F in FIG. 1P. FIG. 1PP shows enlarged view of section 150 in FIG. 1P, and shows that cavity 144 includes a first portion 152 and a second portion 154. Portions 152 and 154 may or may not be separated by a wall, and both portions 152 and 154 may include circuitry and/or one or more batteries.

Figure 1Q:
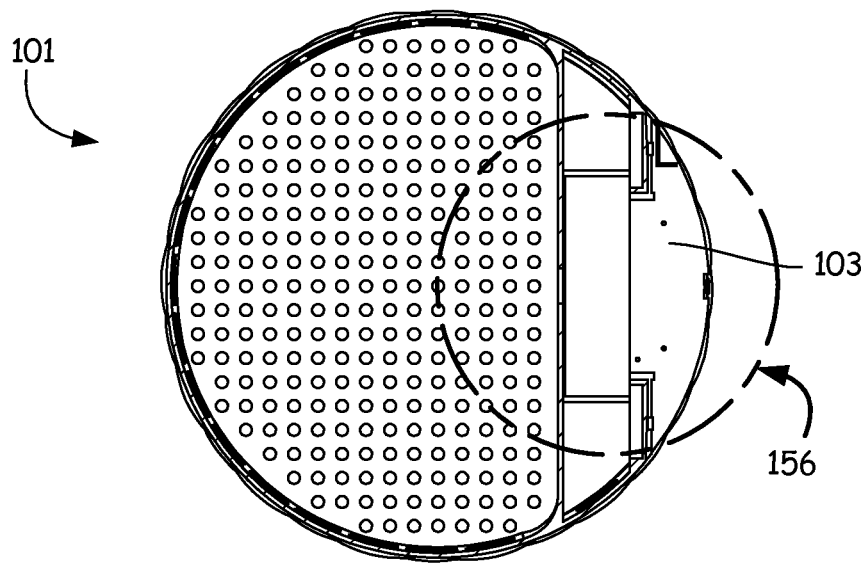
Figure 1Q:
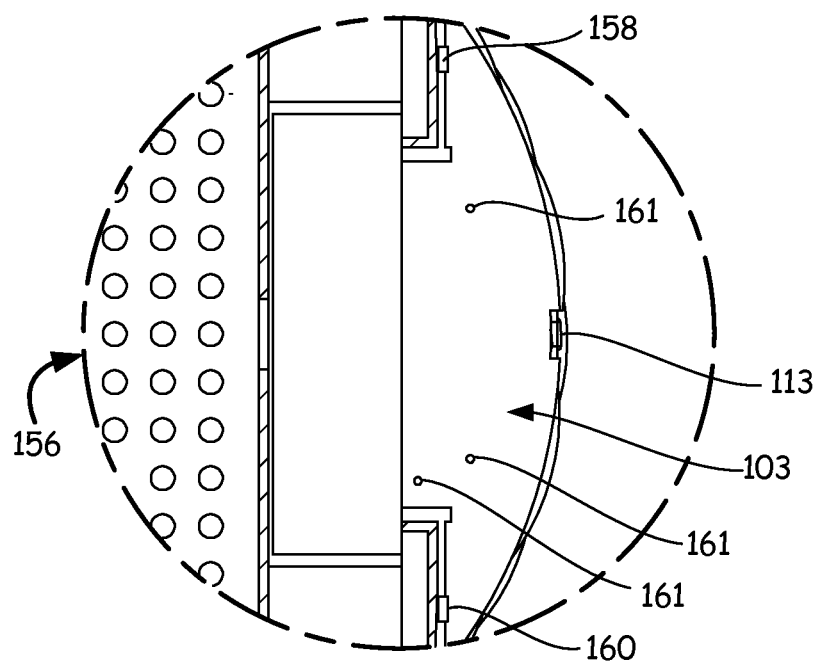

FIG. 1Q is a sectional view as taken along lines H-H in FIG. 1M. FIG. 1QQ shows enlarged view of section 156 of FIG. 1Q. Ledge 103 includes recess 113 and holes 158 and 160 that are configured to receive hooks of cap 104B. Also shown in FIG. 1QQ are holes 161 that are configured to receive screws or other suitable fasteners that may be used to couple reader 106 to ledge 103.

Figure 1R:
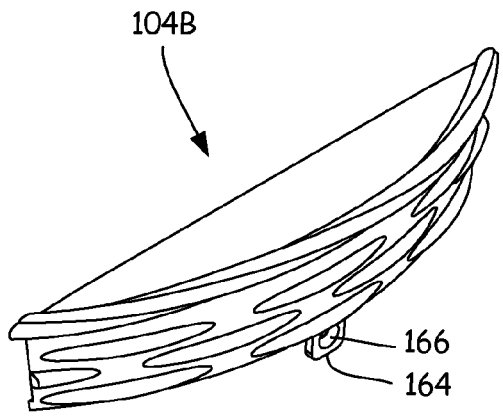
Figure 1S:
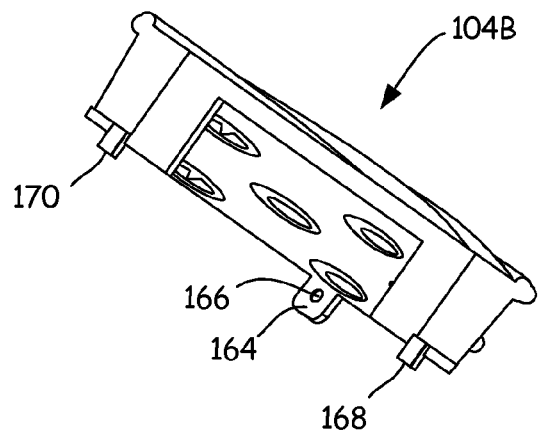
Figure 1T:
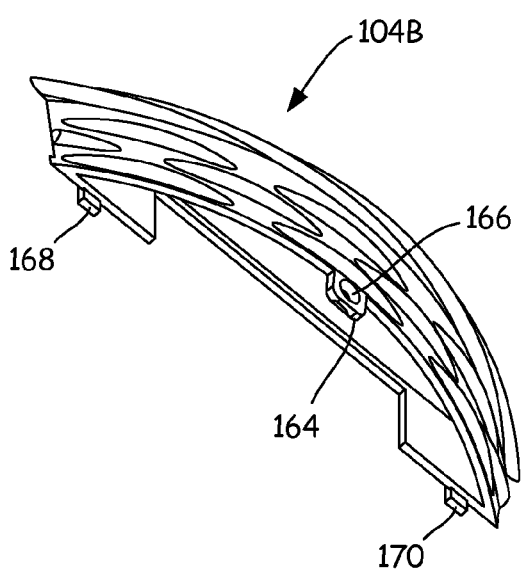

FIGS. 1R and 1S are first and second side perspective views of cap 104B, and FIG. 1T is a bottom perspective view of cap 104B. FIGS. 1U, 1V and 1W are alternate side views of cap 104B. FIG. 1X and FIG. 1Y are top and bottom views, respectively, of cap 104B, and FIG. 1Z is a sectional view as taken along lines A-A of FIG. 1U. Cap 104B is shaped to accommodate a card stripe/chip reader 106 that is mounted on ledge 103 (shown in FIG. 1Q). A bottom portion of cap 104B includes a tab 164 that has a hole 166. The bottom portion of cap 104B also includes hooks 168 and 170. Cap 104B is coupled to main body 101 by inserting tab 164 into recess 113 and inserting hooks 168 and 170 into holes 158 and 160, respectively. When tab 164 is properly positioned within recess 113, hole 166 of tab 164 is aligned with hole 115 of recess 113 such that a fastener (for example, a screw) may be inserted into the aligned holes 115 and 166 to secure cap 104B to main body 101. The recess 113 and tab 164 are sized such that, when the tab 164 is within recess 113, an outer surface of tab 164 is substantially flush with an outer surface of main body 101.

FIG. 1AA is a top view of an inner side of cover 148. As noted above, a circuit board 171 (shown in phantom) may be mounted to the inner side of cover 148. Mounting holes for the circuit board are denoted by reference numerals 172 in FIG. 1AA. Also, cover 148 includes mating features 174 sized to fit into slots, dimples or any other suitable features included along the perimeter of opening 142. Also, cover 148 may include at least one hole 176 that aligns with a corresponding hole in main body 101 such that a fastener (for example, a screw) may be inserted into the aligned holes to secure cover 148 to main body 101. FIG. 1AB is a side view of cover 148, and FIG. 1AC is a perspective view of an inside of cover 148. FIGS. 1AB and 1AC show screws 178 positioned within mounting holes 172.

As noted earlier, in the embodiments described above, a USB cable may be utilized to transfer captured data stored in its internal memory 112 to a personal computer (PC), a laptop computer or mobile device hosting donation acceptance software. FIG. 1F is a diagrammatic illustration showing device 102 connected to a computer 124. It should be noted that, in the device shown in FIGS. 1B through 1E, the entire integrated collection basket 100 and receiver 102 are coupled to the computer to carry out the transfer of captured data stored in internal memory 112. A detailed embodiment of an exemplary computer is described below in connection with FIG. 2.

Figure 2:
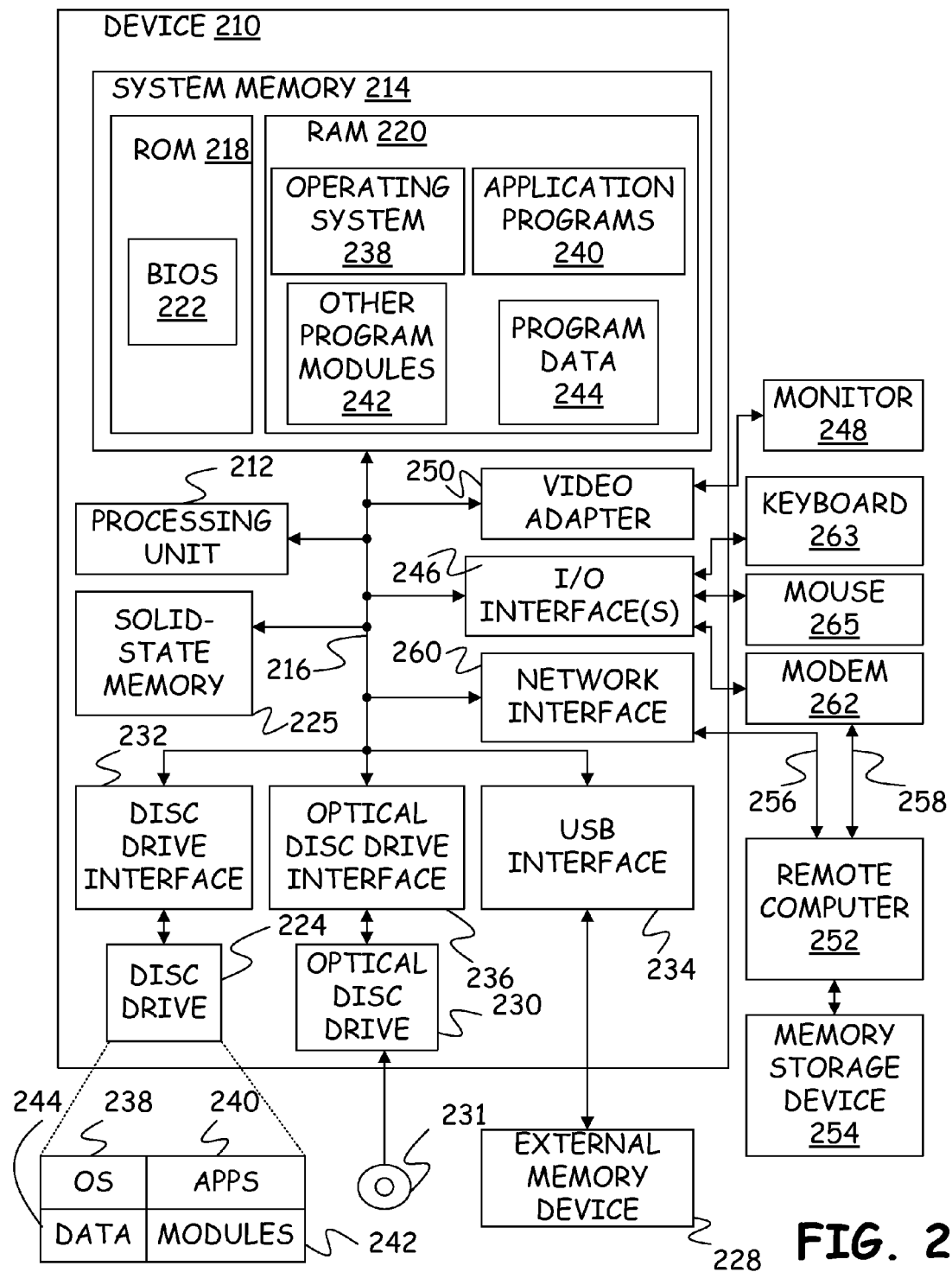
FIG. 2 is a diagrammatic illustration of a computing device that can host donation acceptance software.

An example of a computing device that can host donation acceptance software in the various embodiments is shown in the block diagram of FIG. 2. The computing device 210 of FIG. 2 includes a processing unit 212, a system memory 214 and a system bus 216 that couples the system memory 214 to the processing unit 212. System memory 214 includes read only memory (ROM) 218 and random access memory (RAM) 220. A basic input/output system 222 (BIOS), containing the basic routines that help to transfer information between elements within the computing device 210, is stored in ROM 218. Computer-executable instructions including donation acceptance software to be executed by processing unit 212 may be stored in random access memory 220 before being executed.

In some of the present embodiments, processing of already-captured payment information can be applied in the context of computer systems other than computing device 210. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 210 further includes a hard disc drive 224, a solid state memory 225, an external memory device 228, and an optical disc drive 230. External memory device 228 can include an external disc drive or solid state memory that may be attached to computing device 210 through an interface such as USB interface 234, which is connected to system bus 216. Optical disc drive 230 can illustratively be utilized for reading data from (or writing data to) optical media, such as a CD-ROM disc 231. Hard disc drive 224 and optical disc drive 230 are connected to the system bus 216 by a hard disc drive interface 232 and an optical disc drive interface 236, respectively. The drives and external memory devices and their associated non-transitory computer-readable media provide nonvolatile storage media for the computing device 210 on which computer-executable instructions and computer-readable data structures may be stored. Other types of media that are readable by a computer may also be used in the exemplary operation environment.

A number of program modules may be stored in the drives and RAM 220, including an operating system 238, one or more application programs 240, other program modules 242 and program data 244. In particular, application programs 240 can include code used to carry out donation-related transactions in accordance with exemplary embodiments, perform analysis of stored donation-related transactions, and display user interfaces for carrying out queries, updates, etc., of stored donation-related information. Program data 244 may include pending donation-related transactions that need to be completed, donation-related transaction history, donation-related marketing information, etc.

Input devices including a keyboard 263 and a mouse 265 are connected to system bus 216 through an input/output interface 246 that is coupled to system bus 216. Monitor 248 is connected to the system bus 216 through a video adapter 250 and provides graphical images to users. Other peripheral output devices (e.g., speakers or printers) could also be included but have not been illustrated. In accordance with some embodiments, monitor 248 comprises a touch screen that both displays input and provides locations on the screen where the user is contacting the screen.

The computing device 210 may operate in a network environment utilizing connections to one or more remote computers, such as a remote computer 252. The remote computer 252 may be a server, a router, a peer device, or other common network node. Remote computer 252 may include many or all of the features and elements described in relation to computing device 210, although only a memory storage device 254 has been illustrated in FIG. 2. The network connections depicted in FIG. 2 include a local area network (LAN) 256 and a wide area network (WAN) 258. Such network environments are commonplace in the art.

The computing device 210 is connected to the LAN 256 through a network interface 260. The computing device 210 is also connected to WAN 258 and includes a modem 262 for establishing communications over the WAN 258. The modem 262, which may be internal or external, is connected to the system bus 216 via the I/O interface 246. Modem 262 may be a wired modem or wireless modem that receives and transmits signals through an antenna.

In a networked environment, program modules depicted relative to the computing device 210, or portions thereof, may be stored in the remote memory storage device 254. For example, application programs may be stored utilizing memory storage device 254. In addition, data associated with an application program may illustratively be stored within memory storage device 254. It will be appreciated that the network connections shown in FIG. 2 are exemplary and other means for establishing a communications link between the computers, such as a wireless interface communications link, may be used.

In general, the present embodiments are operational with numerous general purpose or special purpose computing system environments or configurations. Examples of well-known computing systems, environments, and/or configurations that may be suitable for use with the present embodiments include, but are not limited to, personal computers, server computers, hand-held or laptop devices, PDAs, multiprocessor systems, microprocessor-based systems, set top boxes, programmable consumer electronics, network PCs, minicomputers, mainframe computers, telephony systems, distributed computing environments that include any of the above systems or devices, and the like.

The present embodiments may be described in the general context of computer-executable instructions, such as program modules, being executed by a computer. Generally, program modules include routines, programs, objects, components, data structures, etc. that perform particular tasks or implement particular abstract data types. The present embodiments are designed to be practiced in distributed computing environments where tasks are performed by remote processing devices that are linked through a communications network. In a distributed computing environment, program modules are located in both local and remote computer storage media including memory storage devices.

The above-described idea improves donation acceptance systems by providing an electronic payment receiver in a donation basket and improves functioning of a computer that tracks donations.

Although the present invention has been described with reference to preferred embodiments, workers skilled in the art will recognize that changes may be made in form and detail without departing from the spirit and scope of the invention.

What is claimed is:

1. An apparatus comprising:
    a money collection basket having an integrated electronic payment receiver, wherein the money collection basket comprises:
        a main body having an upper surface and a ledge below the upper surface, wherein the ledge extends to an outer edge of the main body; and
        a cap that is detachably coupled to the main body, wherein the cap rests on the ledge when the cap is coupled to the main body, and wherein the ledge comprises a recess that is configured to receive a tab included in the cap, and wherein the tab includes a hole that is configured to align with a corresponding hole included in the recess, and
    wherein the electronic payment receiver comprises a first portion that is non-detachably integrated into the main body of the money collection basket, and wherein the electronic payment receiver comprises a second portion that is a part of the cap, and
    wherein the money collection basket includes a rim having slots that are co-linearly aligned with a card-reading slot of the electronic payment receiver, and wherein the slots in the rim are formed at a junction of the first portion of the electronic payment receiver, which is non-detachably integrated into the main body, and the cap.

2. The apparatus of claim 1 and wherein the first portion of the electronic payment receiver that is non-detachably integrated into the main body of the money collection basket comprises a donation amount selection button interface.

3. The apparatus of claim 2 and wherein the donation amount selection button interface is customizable for different donation amounts.

4. The apparatus of claim 1 and wherein the money collection basket having the integrated electronic payment receiver comprises a memory and a Universal Serial Bus (USB) port.

5. The apparatus of claim 4 and wherein the memory is configured to store any received electronic payment information in an encrypted form.

6. The apparatus of claim 1 and wherein the main body comprises an outer bottom portion that includes an opening into a cavity in the main body, and wherein the cavity is configured to receive circuitry.

7. The apparatus of claim 6 and wherein the main body further comprises a detachable cover for the opening into the cavity, and wherein at least a portion of the circuitry is mounted on an inner side of the detachable cover.

8. The apparatus of claim 7 and wherein the cavity comprises a first portion that extends substantially from the inner side of the detachable cover to just below a top of the main body and a second portion that extends substantially form the inner side of the detachable cover of the main body to just below the ledge of the main body.

9. The apparatus of claim 8 and wherein the first portion of the cavity is substantially deeper than the second portion of the cavity.

10. The apparatus of claim 8 and wherein the ledge is configured to receive at least one of a card reader or a chip reader.

11. The apparatus of claim 1 and wherein an outer surface of the tab is substantially flush with an outer surface of the main body when the tab is secured within the recess.

12. The apparatus of claim 1 and wherein the ledge further comprises holes, and wherein the cap further comprises hooks configured to fit into the holes in the ledge.

* * * * *

UNITED STATES PATENT AND TRADEMARK OFFICE
CERTIFICATE OF CORRECTION

PATENT NO. : 9,437,085 B1
APPLICATION NO. : 14/873996
DATED : September 6, 2016
INVENTOR(S) : Nathan D. Rempe et al.

Page 1 of 1

It is certified that error appears in the above-identified patent and that said Letters Patent is hereby corrected as shown below:

In the Claims

Column 9, Claim 8, Line 5, please replace the word "form" with the word --from--.

Signed and Sealed this
Twenty-second Day of September, 2020

Andrei Iancu
*Director of the United States Patent and Trademark Office*